Patented Aug. 1, 1950

2,517,352

UNITED STATES PATENT OFFICE 2,517,352

THERMOPLASTIC COMPOSITIONS PLASTICIZED WITH ESTERS OF 3,5,5-TRIMETHYL-1-HEXANOL

Hugh G. Reid, Norton-on-Tees, England, assignor to Imperial Chemical Industries Limited, a corporation of Great Britain No Drawing. Application August 26, 1948, Serial No. 46,363. In Great Britain September 8, 1947

19 Claims. (Cl. 260—31.8)

This invention relates to new compositions, and more particularly to compositions containing organic thermoplastic materials and shaped articles manufactured from such compositions. The invention is concerned with compositions containing one or more organic thermoplastic materials and one or more plasticisers therefor.

A wide variety of plasticisers have previously been proposed for incorporation into compositions comprising organic thermoplastic materials. Thus, for example, numerous esters, such as certain phthalates, for example, cyclohexyl, octyl and dodecyl phthalates, phosphates, glycollates and citrates have been used as plasticisers for different organic thermoplastic materials, including cellulose derivatives, for example, cellulose acetate, cellulose acetobutyrate, cellulose nitrate or nitrocellulose, and ethyl cellulose, polymers and interpolymers of various unsaturated compounds, for example, vinyl chloride and vinyl acetate, and derivatives of such polymers and interpolymers, for example, partially or completely hydrolysed polymers and interpolymers of vinyl acetate and the corresponding acetal derivatives, and halogenated polymers of ethylene. The choice of plasticiser to be used depends on a variety of factors, such as the particular thermoplastic material to be plasticised, and the use to which the resultant composition is to be put. The plasticiser must be sufficiently compatible with the organic thermoplastic material and must be undissolved and stable in the presence of any substances with which the composition is likely to come into contact. Furthermore, the plasticiser must be retained in the composition under a wide variety of conditions.

The nature and the proportion of plasticiser used in a given composition will affect the physical properties of the composition, for example, the flexibility, electrical resistivity, softening-point, and toughness, and to some extent the chemical properties such as stability and inflammability. In addition to plasticisers, plasticiser extenders such as chlorinated paraffin waxes as described in British Patent specifications Nos. 573,840, 573,841 and 579,550 may be incorporated, for example, to increase the compatibility of a true plasticiser for the thermoplastic material or to reduce the flexibility of the composition. Whilst for most purposes it is usually possible to select a suitable plasticiser from those already known, for some applications known plasticisers are not completely satisfactory, and it is usually necessary to compromise between a number of different plasticisers for a particular purpose, consideration being given to physical properties, availability and cost.

An object of this invention is to provide new compositions of matter comprising organic thermoplastic materials and plasticisers therefor. Another object of the invention is to provide such compositions from which may be produced articles of improved mechanical properties, for example, by calendering. A further object is to provide such compositions which shall have a combination of high volume electrical resistivity, softness, and retention of flexibility at low temperatures. Other objects will appear hereinafter.

These objects are accomplished according to the present invention by providing a composition comprising one or more organic thermoplastic materials, at least one ester derived from a nonyl alcohol and a monobasic organic acid, and at least one ester derived from a nonyl alcohol and a polybasic organic acid.

The use of nonyl esters of monobasic acids as plasticisers is described and claimed in copending British patent application No. 24,639/47, and the use of nonyl esters of polybasic acids as plasticisers is described and claimed in copending British patent application No. 24,640/47.

The organic thermoplastic material or materials may consist of one or more natural or synthetic resins, including, for example, cellulose derivatives, such as cellulose nitrate or nitrocellulose, cellulose acetate, cellulose acetobutyrate, cellulose acetopropionate, ethyl cellulose and benzyl cellulose, polymers and interpolymers of compounds containing the vinylidene group (that is, the group $CH_2=C<$), such as vinyl chloride, vinyl acetate, vinylidene chloride, and acrylic acid derivatives, for example, methyl methacrylate and acrylonitrile, certain derivatives of some of these polymers, such as acetals of hydrolysed polyvinyl ester derivatives, especially butyrals, halogenated solid polymers of ethylene, and synthetic rubbers such as neoprene and butadiene copolymers with styrene or acrylonitrile. The plasticisers of this invention are of particular value when the organic thermoplastic material used in the compositions of the present invention is a polymer or copolymer of vinyl chloride.

It is preferred that the nonyl alcohol from which the ester plasticiser is derived should consist primarily of 3,5,5-trimethyl-1-hexanol, $CH_3.C(CH_3)_2.CH_2.CH(CH_3)CH_2.CH_2OH$, since the esters of this isomer enhance the mechanical properties and electrical resistivity of compositions containing organic thermoplastic materials to a particularly high degree, but other isomeric nonyl alcohols may be present. Thus in the synthesis of 3,5,5-trimethtyl-1-hexanol minor amounts of the other isomeric nonyl alcohols are almost invariably formed. It has been found, however, that the alcohol may be esterified to produce the nonyl ester plasticiser without removing the isomeric alcohols and without any substantial loss in properties. However, the other isomeric alcohols are also suitable for the practice of this invention. As an additional advantage to those already mentioned, it has been found that compositions containing the phthalate of 3,5,5-trimethyl-1-hexanol are less likely to be discoloured than similar compositions containing other plasticisers such as 2-ethylhexyl phthalate. It has been found that compositions of the invention containing polymers or interpolymers of vinyl chloride and vinylidene chloride are of improved heat-stability to previously known compositions of such polymers and interpolymers with plasticisers.

Mono-basic organic acids suitable for forming ester plasticisers for use in the practice of this invention include, for example, formic, stearic, methacrylic, oleic, ricinoleic, lauric, acetic, propionic, butyric, hexoic, abietic, glycollic, benzoic and chlorbenzoic acids.

The preferred esters of mono-basic acids for use in the practice of this invention are the benzoate, chlorbenzoate, stearate and oleate of 3,5,5-trimethyl-1-hexanol.

Polybasic organic acids suitable for forming ester plasticisers for use in the practice of this invention include, for example, phthalic, adipic, sebacic, succinic, tartaric, citric, aconitic and tricarballylic acids. The preferred polybasic acids are phthalic, adipic and sebacic acids, particularly phthalic acid.

The esters of polybasic acids used in the invention include any ester of a nonyl alcohol with a polybasic acid, or any mixed ester of a nonyl alcohol and one or more other alcohols, preferably containing from 4 to 9 carbon atoms per molecule, for example, 2-ethyl hexanol, with a polybasic acid. By a judicious selection of the other alcohol or alcohols used it is possible to obtain a plasticiser suitable for any particular purpose within a wide range of applications.

The preferred esters of polybasic acids for use in the practice of this invention are di-3,5,5-trimethyl-1-hexyl phthalate, adipate and sebacate.

The compositions of this invention may be in the form of solid moulding materials, pastes, lacquers, solutions or dispersions according to the proportions of the essential ingredients and other ingredients of the compositions. The relative amounts of the thermoplastic materials and the nonyl esters used in forming the compositions of the invention may be varied within wide limits according to the particular properties required. In general the amounts are similar to those used conventionally with other plasticisers, a proportion of total plasticiser in the compositions of from about 10% to 60% by weight, for example, being suitable for most purposes. The relative amounts of esters of monobasic organic acids and esters of polybasic acids used also depends on the particular properties required. Some of the nonyl esters employed in the compositions of the invention are solvents for some organic thermoplastic materials and may be used to produce solutions thereof. Thus nonyl formate and acetate are both solvents for ethyl cellulose, nitrocellulose, chlorinated polythene and vinyl chloride/vinyl acetate copolymers.

In addition to the organic thermoplastic materials and the nonyl ester plasticisers other ingredients may be present in the compositions of the invention if desired, for example, other plasticisers, plasticiser extenders such as chlorinated paraffin waxes, stabilisers, fillers and colouring materials. Thus with vinyl chloride polymers and interpolymers it is often desirable to include a substance which acts as a heat-stabiliser, and any heat-stabilisers for vinyl chloride polymers and interpolymers may be used in the compositions of the invention.

The compositions of this invention are suitable for all applications of previously known thermoplastic resin/plasticiser compositions, including, for example, moulding, extrusion, cable covering, coating applications such as in the manufacture of leather cloth, and the production of hollow articles such as by the methods described in British patent specifications Nos. 521,093; 591,611 and 600,270. Other applications and methods of fabrication for which these compositions are suitable are described in British patent specification No. 500,298. The compositions of the invention are particularly suitable for fabrication by calendering, the calendered products having improved mechanical properties when compared with compositions previously used for the production of articles by calendering thermoplastic compositions. Furthermore, the compositions of the invention have higher volume resistivity than compositions of similar flexibility containing previously known plasticisers. Another advantage of the compositions of the invention is that they have little tendency to lose plasticiser even over long periods of time, so that they do not deteriorate or age.

By employing mixtures of different nonyl esters of monobasic and polybasic organic acids it is often possible to secure properties in the compositions which would be unobtainable otherwise.

The invention is illustrated but in no way limited by the following examples in which all parts are by weight.

*Example 1*

The following formula illustrates a composition suitable for extrusion as belting and other sections.

|  | Parts |
|---|---|
| Polyvinyl chloride | 100 |
| Dinonyl phthalate | 30 |
| Nonyl p-chlorbenzoate | 30 |
| White lead | 8 |
| Titanium oxide | 3 |
| Ethyl palmitate | 1 |

The composition is flexible and durable, having a B. S. hardness of 40 at 20° C.

*Example 2*

A composition prepared in accordance with the following formula is suitable for use as extruded cable sheathing, having good ageing properties, heat-stability, toughness, abrasion resistance and flexibility at low temperatures.

|  | Parts |
|---|---|
| Polyvinyl chloride | 100 |
| Dinonyl phthalate | 70 |
| Dinonyl sebacate | 20 |
| Nonyl p-chlorbenzoate | 10 |
| China clay | 50 |
| White lead | 8 |
| Ethyl palmitate | 1 |
| Carbon black | 1 |

*Example 3*

A solution was prepared according to the following formula:

| | Parts |
|---|---|
| Nitrocellulose grade HX30-50 | 10 |
| Nonyl acetate | 5 |
| Dinonyl phthalate | 5 |
| Butyl acetate | 27 |
| Toluene | 52 |
| Butyl alcohol | 8 |

Clear films were obtained from this solution by the solvent casting technique.

Similar results were obtained by replacing the nonyl acetate by nonyl formate, methacrylate or stearate, or replacing the dinonyl phthalate by dinonyl adipate or sebacate.

I claim:

1. A composition of matter comprising a solid polymer of a substance selected from the group consisting of vinyl chloride, vinyl acetate, and vinylidene chloride in combination with an ester of 3,5,5-trimethyl-1-hexanol with a monobasic organic acid selected from the group consisting of formic, stearic, methacrylic, oleic, ricinoleic, lauric, acetic, propionic, butyric, hexoic, abietic, glycollic, benzoic and chlorobenzoic acids and an ester of 3,5,5-trimethyl-1-hexanol with a polybasic organic acid selected from the group consisting of phthalic, adipic, sebacic, succinic, tartaric, citric, aconitic, and tricarballylic acids.

2. A composition as claimed in claim 1 wherein the monobasic organic acid ester is 3,5,5-trimethyl-1-hexyl benzoate.

3. A composition as claimed in claim 1 wherein the monobasic organic acid ester is 3,5,5-trimethyl-1-hexyl chlorobenzoate.

4. A composition as claimed in claim 1 wherein the monobasic organic acid ester is 3,5,5-trimethyl-1-hexyl formate.

5. A composition as claimed in claim 1 wherein the polybasic organic acid ester is 3,5,5-trimethyl-1-hexyl phthalate.

6. A composition as claimed in claim 1 wherein the polybasic organic acid ester is 3,5,5-trimethyl-1-hexyl adipate.

7. A composition as claimed in claim 1 wherein the polybasic organic acid ester is 3,5,5-trimethyl-1-hexyl sebacate.

8. A composition of matter comprising a solid polymer of vinyl chloride in combination with 3,5,5-trimethyl-1-hexyl benzoate and 3,5,5-trimethyl-1-hexyl phthalate.

9. A composition of matter comprising a solid polymer of vinyl chloride in combination with 3,5,5-trimethyl-1-hexyl chlorbenzoate and 3,5,5-trimethyl-1-hexyl phthalate.

10. A composition of matter comprising a solid polymer of vinyl chloride in combination with 3,5,5-trimethyl-1-hexyl formate and 3,5,5-trimethyl-1-hexyl phthalate.

11. A composition of matter comprising a solid polymer of vinyl chloride in combination with 3,5,5-trimethyl-1-hexyl benzoate and 3,5,5-trimethyl-1-hexyl adipate.

12. A composition of matter comprising a solid polymer of vinyl chloride in combination with 3,5,5-trimethyl-1-hexyl chlorbenzoate and 3,5,5-trimethyl-1-hexyl adipate.

13. A composition of matter comprising a solid polymer of vinyl chloride in combination with 3,5,5-trimethyl-1-hexyl formate and 3,5,5-trimethyl-1-hexyl adipate.

14. A composition of matter comprising a solid polymer of vinyl chloride in combination with 3,5,5-trimethyl-1-hexyl benzoate and 3,5,5-trimethyl-1-hexyl sebacate.

15. A composition of matter comprising a solid polymer of vinyl chloride in combination with 3,5,5-trimethyl-1-hexyl chlorbenzoate and 3,5,5-trimethyl-1-hexyl sebacate.

16. A composition of matter comprising a solid polymer of vinyl chloride in combination with 3,5,5-trimethyl-1-hexyl formate and 3,5,5-trimethyl-1-hexyl sebacate.

17. A composition of matter comprising a reaction product which is an interpolymer of a substance selected from the group consisting of vinyl chloride, vinyl acetate, and vinylidene chloride with acrylonitrile, in combination with an ester of 3,5,5-trimethyl-1-hexanol with a monobasic organic acid selected from the group consisting of formic, stearic, methacrylic, oleic, ricinoleic, lauric, acetic, propionic, butyric, hexoic, abietic, glycollic, benzoic and chlorbenzoic acids and an ester of 3,5,5-trimethyl-1-hexanol with a polybasic organic acid selected from the group consisting of phthalic, adipic, sebacic, succinic, tartaric, citric, aconitic, and tricarballylic acids.

18. A composition as claimed in claim 1 wherein said polymer is an interpolymer of vinyl chloride and methyl methacrylate.

19. A composition as claimed in claim 1 wherein said polymer is an interpolymer of vinyl acetate and vinyl chloride.

HUGH G. REID.

REFERENCES CITED

The following references are of record in the file of this patent:

UNITED STATES PATENTS

| Number | Name | Date |
|---|---|---|
| 2,015,077 | Lawson | Sept. 24, 1935 |
| 2,015,088 | Reid | Sept. 24, 1935 |